April 17, 1956 — H. WARP — 2,742,391
METHOD OF MAKING REINFORCED LAMINATED MATERIAL
Filed Aug. 30, 1946 — 2 Sheets-Sheet 1
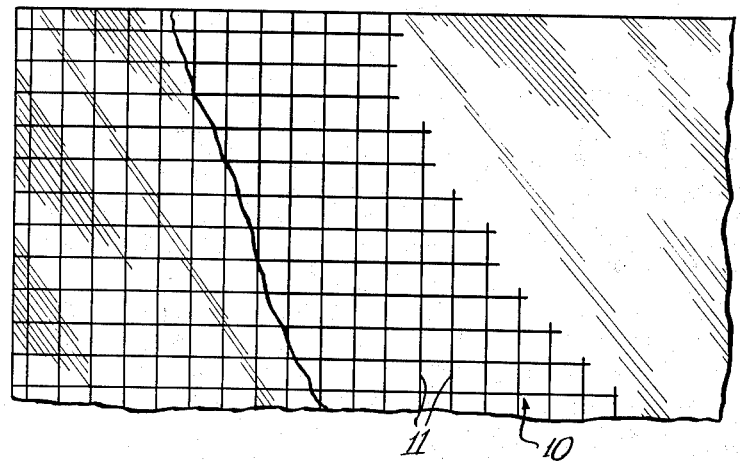
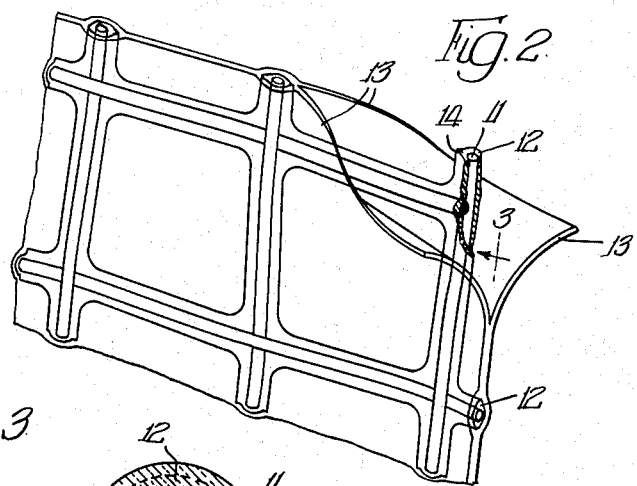
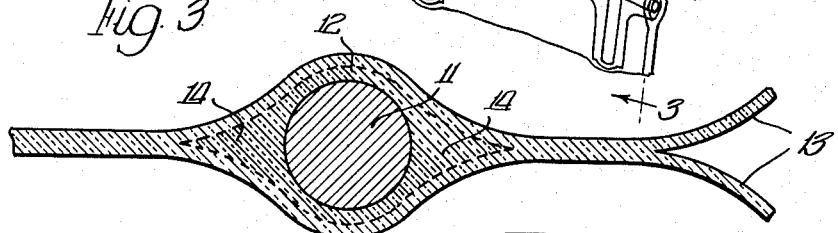
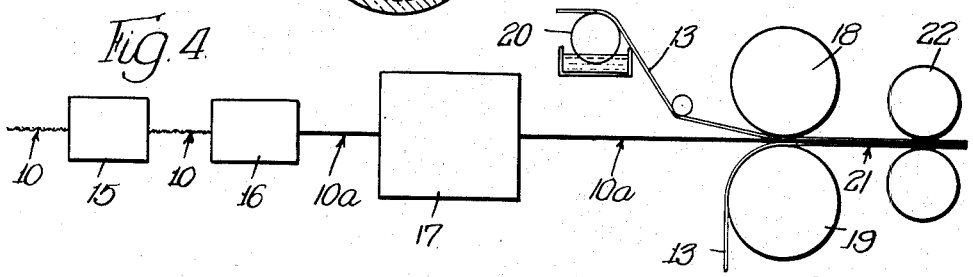
INVENTOR.
Harold Warp, INVENTOR.
Harold Warp,
BY

United States Patent Office 2,742,391
Patented Apr. 17, 1956

2,742,391
METHOD OF MAKING REINFORCED LAMINATED MATERIAL

Harold Warp, Chicago, Ill., assignor to Flex-O-Glass, Inc., a corporation of Illinois Application August 30, 1946, Serial No. 693,885

5 Claims. (Cl. 154—127)

The invention relates generally to the method of making a composite, flexible, laminated, sheet material and more particularly to a transparent and reinforced, flexible, laminated material that may be employed as a glass substitute in light admitting openings.

This application is a continuation in part of my application Serial No. 333,836 and Serial No. 333,837, both filed May 7, 1940, both abandoned.

One object of the invention is to provide a flexible, transparent, laminated, sheet material made by the method herein claimed and having greater strength, durability and transparency than like materials known prior to my invention.

A more particular object is to provide a composite, flexible, laminated, sheet material having a base and reinforcing lamina of large mesh, woven netting and a lamina of a thin, transparent and preformed sheet applied to each side of the base lamina, the sheets being secured to one another by an interflowed bond throughout substantially the entire area of each mesh and to the netting through the medium of an allover coating on the filaments only of the netting of a transparent, synthetic polymer applied and taking a solid form prior to application of the sheets to the netting and with which the sheets also have an interflowed bond, the coating remaining as a separate, distinct and permanent part of the finished material.

Another object is to provide a laminated sheet material of the character defined in the object immediately above in which the coating is of such thickness, is permanently somewhat resiliently yieldable and pliable, and has a tacky surface so that it acts as a binder for the filaments of the netting at their crossover points, as a yieldable layer intermediate the sheets and the filaments absorbing differences in expansion or contraction due to temperature changes and the stresses of flexing, and as a cushion protecting the sheets from the fine filaments, as well as a base to which the sheets are bonded.

Another object is to provide a composite, flexible, laminated sheet material having a base and reinforcing lamina of large mesh, woven netting, an allover coating on the filaments only of the netting of a transparent, synthetic polymer, and a lamina of a thin, transparent and preformed sheet applied to each side of the base lamina in which the sheets are bonded together through the meshes of the netting to form a homogeneous pane and in which the coating on the filaments bonds with the sheets and is of a character to give substantially uniform transparency to the material throughout the entire area of each mesh.

Another object is to provide a laminated sheet material of flexible, preformed sheets of a polymer and a large mesh netting woven from metallic or synthetic monofilaments forming the intermediate lamina, the filaments only of the netting being coated with an allover, relatively thick covering of a polymer having an affinity for the material of the filaments, which coating was dried to normal consistency before application of the sheets to opposite sides of the netting and in that condition is and remains a resiliently yieldable and tacky solid, the sheets being secured by an interflowed bond with one another throughout substantially the entire area of each mesh and by a bond with the coating on the filaments of the netting.

Another object is to provide a laminated sheet material of flexible, preformed sheets of a polymer and a large mesh netting woven from organic or inorganic fibrous cords or filaments forming the intermediate lamina, the filaments only of the netting being impregnated and coated with an allover, relatively thick covering of a polymer dried to the consistency of a solid before application of the sheets to opposite sides of the netting, the sheets being secured by an interflowed bond with one another throughout substantially the entire area of each mesh and by a bond with the coating on the filaments of the netting.

A further object is to provide a new and improved method of making a transparent material composed of a large mesh netting and a thin, preformed sheet laminated to each side of the netting including steps resulting in the formation on the filaments only of the netting of a cushion-like coating of a synthetic polymer reduced prior to lamination of the sheets to the netting to a resiliently yieldable solid so as to form a separate, distinct and permanent part of the finished material, and steps resulting in the bonding of the sheets to the coating on the filaments of the netting and the interflowed bonding of the sheets to one another through the meshes of the netting throughout substantially the entire area of each mesh.

Still a further object is to provide a new and improved method of making a transparent, laminated material having a large mesh netting, which includes the steps of coating the strands or filaments of the netting with a synthetic polymer of a character which remains pliable, resiliently yieldable and with a slightly tacky surface even when dried, drying the coating, applying to one side of the thus coated and dried netting a sheet of transparent material which is temporarily and briefly treated on the side adjacent the netting with a solvent capable of attacking and softening both the sheet and the coating, applying to the opposite side of the netting a sheet which has been slightly heated prior to application thereof to the netting and passing the thus treated netting and sheets between heated squeeze rolls to force the same into intimate contact and to drive off the solvent.

Other objects and advantages will become apparent from the following detailed description taken in connection with the accompanying drawings, in which:

Fig. 1 is a plan view of a piece of laminated material having the features and made in accordance with the method of this invention. This figure is approximately to scale and has successive laminae broken away to show in elevation a portion of each of the laminae composing the material.

Fig. 2 is a perspective view of a small portion of the material shown in Fig. 1, enlarged in the order of nine or ten times, and showing the outer laminae peeled back from the base lamina. For purposes of clarity, the outer laminae and the coating on the filaments are shown thicker than normal for the named enlargement.

Fig. 3 is a sectional view taken approximately along the line 3—3 of Fig. 2 and enlarged in the order of ninety times over Fig. 1, in order more clearly to show the construction.

Fig. 4 is a diagrammatic view illustrative of the steps of the method of manufacture.

Figure 5:
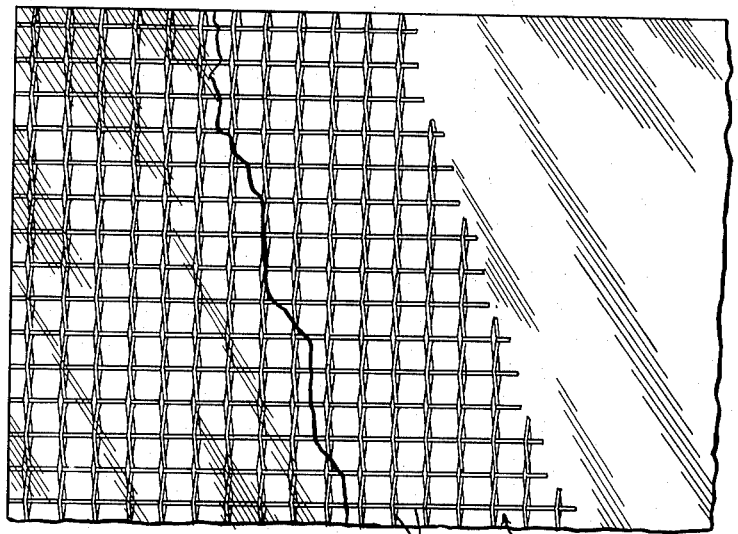
Fig. 5 is a view similar to Fig. 1 but showing a modified form of the invention employing a fiber netting.

As shown in the drawings for purposes of disclosure and speaking now generally, the material is composed of three laminations of which the intermediate or base lamina is a large mesh, woven, flexible netting and each of the outside laminations is a thin, transparent and preformed sheet of a synthetic polymer. Also forming a distinct element of the finished material is an allover coating on the strands or filaments only of the netting forming a permanent part of the finished material separate and distinct from the sheets. The coating is of a synthetic polymer, dried to a solid state prior to application of the sheets to the netting, which in that state remains permanently resiliently pliable and yieldable and with a tacky surface. This coating serves a variety of purposes including that of acting as a binder for the strands or filaments of the netting at the crossover points, serving to secure the same against displacement; that of a cushion preventing the filaments of the netting from cutting through the thin sheets laminated thereover; that of a stress and strain absorber taking up differences in expansion or contraction between the sheets and the netting with changes in temperature, and taking up the different stresses with flexing of the material; and that of a base to which the sheets may be bonded and thus secured directly to the netting. Preferably the sheets are bonded by an interflowed or integrated bond with the coating on the netting as well as to one another through the meshes of the netting throughout substantially the entire area of each mesh.

Turning now to that form of the invention shown in Figs. 1 to 3, the intermediate or base lamina of the material is a woven netting 10 composed of fine elements or filaments 11. Inasmuch as a prime use of the material is that of a glass substitute in light-admitting openings, and in order that the netting 10 may not unduly affect the transparency of the finished material, the netting is composed of single and individual filaments or strands 11 which are extremely fine, specifically in the neighborhood of .01 of an inch in diameter. These filaments 11 are so woven as to form a large mesh netting. As best seen in Fig. 1, the netting 10 runs approximately four filaments to the inch. The netting 10 of Figs. 1 to 3 is intended to be exemplary of a type of netting in which the filaments are generally considered as not moisture-absorptive. In the figures, the filaments 11 are shown as metallic but it is to be understood that they might equally well be synthetic monofilaments. If the filaments 11 are metallic, particularly if they are of steel or iron, they may or may not be galvanized to protect them against rusting, for protection is given by the coating applied to the filaments as will presently be described in greater particularity.

As above indicated and as will hereinafter be more fully disclosed in the description of the method forming a part of this application, the filaments 11 are given a cushion-like coating 12 of a compound which has an affinity for the metal or synthetic of the filament and which normally is a solid which remains permanently slightly resiliently yieldable and pliable and has a tacky surface. The compound forming the coating should also be chosen with a view to its transparency, light stability, ability to transmit ultraviolet rays and resistance to decomposition upon exposure to atmospheric conditions, particularly sunlight and moisture. The compound is a synthetic polymer applied to the filaments of the netting in a fluid state having been reduced to that state either by being dissolved in a suitable quantity of solvent, by being suspended in a plasticizer to form a dispersion, or by being suspended as an emulsion in water. Prior to application of the sheets to the netting, the polymer is returned to a solid state so that it may and does adhere in surrounding relation to the filaments of the netting and does not squeeze off during the application of the sheets as would be the case were the coating to remain in a fluid or semifluid state up to that point. In the case of the solution and the emulsion, the polymer forming the coating is restored to a solid state by driving off the solvent or the water as the case may be, while in the case of the dispersion the plasticizer is absorbed into the fine polymer particles to become a homogeneous solid as that action is now well understood by those skilled in the art. In the case of the dispersion and the emulsion, neither the plasticizer nor the water, should any remain in a free state, is capable of attacking subsequently applied laminae. In the case of the solution, however, the solvent is driven off not only to restore the polymer to a solid state in order that it better adhere to the filaments but for the further purpose of preventing the solvent from remaining and attacking and eating through the subsequently applied sheets which it would otherwise do.

While, no doubt, a variety of organic polymers might be found suitable for this coating, a vinyl compound is preferred. More particularly, the polymer found particularly suitable is a vinyl compound known in the trade under the initials VMCH, this latter compound being composed of vinyl chloride, vinyl acetate, and maleic anhydride. Also suitable is polyvinyl acetate, particularly that known in the trade under the initials AYAF and a vinyl compound known in the trade by the initials VYNW. When the material is to be employed in a low temperature area or in an environment or for a purpose which will cause a great deal of flexing of the material, it frequently is desirable to add additional plasticizer to the coating compounds above described. This is particularly true of the vinyl chloride-vinyl acetate compound known in the trade under the initials VMCH. A preferred plasticizer is dioctyl phthalate though dibutyl phthalate is also suitable. The dioctyl phthalate is preferred because it is more moisture resistant, has better light stability, and remains flexible at low temperatures. The additional plasticizer is most conveniently added while the coating compound is in a fluid state prior to application of the coating to the netting. The additional plasticizer gives greater pliability to the coating and in particular causes the coating to retain its yieldably resilient character at low temperatures.

Completing the material are the outer laminations each composed of a thin (on the order of .001 of an inch thick), transparent, preformed, ultraviolet ray transmitting sheet 13. The synthetic of which the sheets 13 are composed is chosen with a view to tensile strength, high degree of ultraviolet ray transmission, light stability, resistance to decomposition upon exposure to atmospheric conditions, flexibility at both high and low temperatures, and ability to bond with the coating 12 on the filaments of the netting. A preferred composition is cellulose acetate butyrate. Other compositions that might be employed are cellulose acetate, cellulose acetate propionate, ethyl cellulose, styrene, polyethylene and acrylic esters. By steps in the method of manufacture that will presently be made known, the sheets are secured to the netting by an integrated bond with the coating 12 on the filaments of the netting and by an interflowed bond with one another through the meshes of the netting, preferably throughout substantially the entire area of each mesh.

The result is a material best pictured in Figs. 2 and 3, namely, in which there is in the finished product the netting 10, the sheets 13, and interposed between the sheets and the filaments 11 of the netting a separate, distinct and permanent layer of a polymer, namely the coating 12. In the meshes the finished material is homogeneous and unitary for over those areas the sheets 13 have interflowed to form such a homogeneous pane and no air spaces or layers of adhesive material are present. At the filaments 11 of the netting the sheets 13 are, of course, divided to surround and enclose within them the filaments 11 and the coating 12 on the filaments. Here also an integrated and direct bond is effected between the coating 12 and the sheets as distinguished from a bond formed by an adhesive which would discolor and decompose and thus permit separation of the sheets from the coating on the netting. As a result, the material is of substantially uniform transparency throughout each mesh.

It is believed readily apparent from the foregoing that the coating 12 of a synthetic polymer serves a great variety of functions and contributes materially to the enhanced strength, durability and quality of the finished material. The coating 12 is particularly important where a wire netting 10 is employed. With a wire netting composed of filaments on the order of .01 of an inch in diameter and woven four to the inch, there is a very great tendency for the filaments of the netting to become displaced in the handling of the netting and in the manufacture of the finished material. One function of the coating, therefore, is to act as a binder for the filaments of the netting at their crossover points holding them against displacement. Fine wire filaments of the character described also have a tendency to cut through the sheets 13 during the laminating of the sheets to the netting. Thus a second function of the coating 12 is to serve as a cushion interposed between the filaments and the sheets to prevent this tendency toward a cutting of the sheets. A third function is that of a resiliently yielding layer taking up differences in expansion or contraction between the metal of the netting and the synthetic sheets with changes in temperature, and taking up stresses which result from flexing or rolling of the material. A fourth function is that of a base to which the sheets may be bonded much more securely than to the wires of the netting themselves. A fifth function is that of a filler of air spaces that would otherwise remain in the finished material, particularly at the crossover points of the filaments of the netting and even immediately adjacent the filaments at other than their crossover points.

As best seen in Fig. 3, the coating 12 during the laminating process is deformed from a true cylinder to a shape in which diametrically opposed wedges 14 are present. These wedges extend in the plane of the material and take up any air spaces that might otherwise be formed as a result of the sheets not being bonded together immediately adjacent the filaments. As a matter of fact, the wedge-shaped deformation of the coating obviates the necessity of having the sheets form a true and complete circle about a filament. Such a true circle is substantially unobtainable in any practical manufacturing operation and, even if obtained, would result in sharp right-angle bends in the sheets which would so stress the sheets as to weaken the material. With the construction herein shown, however, the wedge-like projections 14 of the coating 12 permit the sheets to come together without such a right-angle bend.

Having described the material and the advantages of its construction, the steps in the method of manufacture will now be described. The netting 10, particularly where it is composed of metallic filaments, preferably is first passed through some cleansing or pickling bath, diagrammatically represented at 15 in Fig. 4. It will be appreciated, of course, that whenever the netting is handled prior to the application of the coating 12 thereto great care must be exercised to prevent the netting from becoming distorted in any way and, particularly, so as to prevent the individual filaments of the netting from shifting about, which they have a very great tendency to do. It is sometimes necessary, therefore, that the individual filaments be cleaned before weaving but, as stated, preferably the woven netting is passed through the cleansing bath 15.

From the cleansing bath 15, the netting 10 passes to a second bath, represented at 16. This latter bath is the coating bath and to that end contains the synthetic polymer, being one of those above named, which forms the coating 12 on the filaments of the netting. Inasmuch as it is the desire to coat the filaments only of the netting, leaving the meshes open, the compound in the bath 16 is reduced to such consistency, primarily fluidity, that a coating 12 of the desired thickness adheres to the filaments of the netting as the netting is passed therethrough while the compound is unable successfully to span and close the meshes of the netting. To that end, the polymer may be dissolved in a suitable solvent, such as methyl ethyl ketone or acetone, for example. Roughly, the proportions are approximately three parts of solvent to one part of the synthetic compound though this may vary somewhat with the compound employed. As previously stated, a plasticizer may be added to the bath to make the resulting coating more pliable and better to retain its pliability at low temperatures. Where a dispersion or an emulsion rather than a solution of the polymer is preferred, the compound in the bath will again be of such fluidity that a coating will be applied to the filaments of the netting only while the meshes of the netting remain open.

From the coating bath 16 the now coated netting, designated 10a for convenience, passes to a controlled atmosphere chamber, represented at 17, for the purpose of restoring the polymer to its normal solid state by driving off the solvent or the water in the case of a solution and an emulsion and causing absorption of the plasticizer in the case of a dispersion. Conditions will, of course, vary with the nature of the bath and even within a bath of any one type. Thus in the case of a solution, conditions will vary with the volatility of the solvent employed and with other factors, one such factor being the completeness with which the solvent is driven out of the polymer. It has been found that retaining the coated netting in the chamber 17 for a period of from twelve to fifteen seconds with the temperature in the chamber at about 200° F. the most satisfactory product results. At the end of that period of time, the coating has definitely set and has returned to a solid state. Because of the nature of the polymer, of course, the coating is not rigid or brittle but is resiliently yieldable and pliable and the surface of the coating is tacky. For all practical purposes, all of the solvent is driven off and in no event should the solvent constitute more than from ten to fifteen per cent by weight of the coating as it emerges from the chamber 17. If more than that amount of solvent is permitted to remain in the coating, detrimental effects will subsequently be experienced.

Where the compound in the bath is a dispersion rather than a solution, the temperature of the chamber 17 will have to be considerably higher, on the order of 350° F., for temperatures of that range are required for the reaction to take place which changes a dispersion from a fluid to a solid. In the event that the compound in the bath 16 is an emulsion, a still different temperature may be required and in both cases the time element is likely to vary from that required for driving off a solvent. In this connection it may be well to state, as those versed in the art will realize, that at the present time applying the coating 12 by means of the dispersion is likely not to prove possible where the netting is made of synthetic filaments but will have to be limited to a netting made of metallic or other filaments capable of withstanding temperatures in the order of 350° F. At the present time, the synthetics found suitable for the making of filaments would not withstand temperatures of that order.

From the drying chamber 17, the coated netting 10a next passes to a pair of heated squeeze rolls 18 and 19 where the sheets 13 are laminated to the coated netting. At least one of the sheets, herein the upper sheet as viewed in Fig. 4, has applied to the face thereof to be placed against the netting a small amount of solvent of a character capable of and adapted to attack and soften the surface of both the sheet and the coating on the netting. This very small amount of solvent is herein applied by passing the sheet over a transfer roller 20. A preferred solvent under the present circumstances is methyl cellusolve though it is possible to employ diacetone, acetone or a variety of other solvents, the essential requirement being that they be capable of attacking both the sheet and the coating on the netting. Inasmuch as the sheets 13 are extremely thin, on the order of .001 of an inch or so, the solvent is applied for a very short interval of time only, herein being something on the order of one and one-half seconds, the sheet at the end of that interval being passed between the heated squeeze rolls 18 and 19 to drive off the solvent. The sheet 13 which has the solvent applied to one side thereof is so fed to the squeeze rolls that the sheet makes contact with the upper roll 18 only as it passes between the two rolls 18 and 19. The sheet may make contact and preferably does make contact with the coated netting 10a prior to that time so as to give the solvent on the sheet an opportunity to be transferred onto and attack the coating on the netting. Though the sheet with the solvent on it contacts one side of the netting only, the known characteristic and ability of a solvent to spread over a surface causes the entire coating to be wet by the solvent.

The lower sheet 13, as viewed in Fig. 4, is in the preferred method preheated so as to be in a condition where it is readily and quickly acted upon by the solvent carried by the upper sheet and is also in a condition where it bonds more readily with the upper sheet and with the coating on the netting. To that end, the lower sheet 13 is herein given such approach to the lower squeeze roll 19 that it is in contact with the roll and being heated thereby for a period of about two seconds prior to the time that it is pressed against the coated netting. Both the rolls 18 and 19 are maintained at a temperature of approximately 180° F. Naturally the pressure between the squeeze rolls is such that the sheets are forced into intimate contact through the meshes of the netting and around the filaments of the netting, as previously described, without causing the filaments to cut through the very thin sheets. Likewise the surfaces of the rolls 18 and 19 are such that the sheets will be depressed into the recesses. It has been found material that pressure rolls be employed not only from the standpoint that production is expedited because of the continuous laminating operation, but because it is essential that the solvent applied to the upper sheet 13 be driven off after the stated interval of time and that there be freedom for escape of the solvent. If escape of the solvent is prevented by the employment of pads or the like, in place of rolls with their substantially line contact, the solvent, instead of merely softening the surface of the sheet slightly, eats its way completely through the sheet leaving such a method impractical and useless and the resultant product totally useless.

From the squeeze rolls 18 and 19 the now three-laminae material, designated as 21 in Fig. 4, may pass to still other sets of heated squeeze rolls 22 in order further to drive off any solvent that may remain in the material.

It is to be noted that the sheets 13 are not secured to one another through the employment of an adhesive or of any other material which remains in the finished product. On the contrary, the sheets are temporarily softened by the employment of a solvent and this solvent then driven off in order that the sheets may again return to a solid state with the bond being effected by an actual interflowing of the sheets to form a homogeneous pane. Similarly, the bond effected between the sheets and the coating on the netting is a direct sheet-to-coating bond and not a bond effected by an intervening layer of an adhesive. In this way, there is, in the first place, no foreign matter that can discolor upon exposure to sunlight as is characteristic of so many adhesives, nor is there present any material that can become brittle or lose its adhesive qualities and thus permit separation of the sheets 13 from one another or from the coating on the netting, nor any material that materially alters the transparency of the panes adjacent the filaments.

Figure 6:
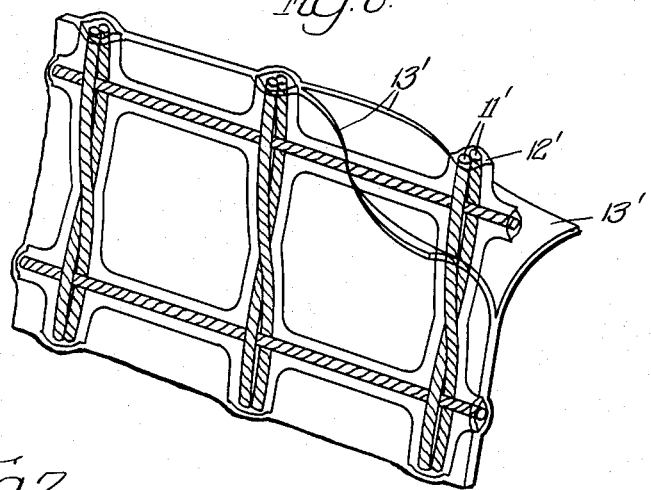
Figs. 6 and 7 are views of the same character as Figs. 2 and 3 but showing the material of Fig. 4.
Figure 7:
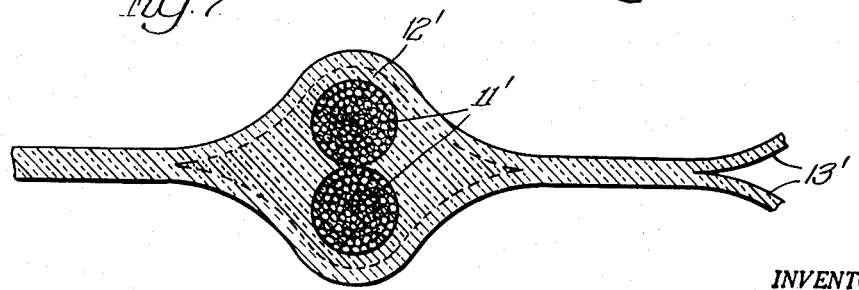

Turning now to the form of the invention shown in Figs. 5 to 7, inclusive, the material still comprises a large mesh, woven netting 10' having laminated to each side thereof a thin, transparent sheet 13'. In this form of the invention, the netting 10', instead of being a metallic or synthetic monofilament, is a netting woven from fibrous strands or filaments 11'. One of the serious difficulties experienced in the past in the employment of a glass substitute material having fiber filament reinforcings is that the filaments when exposed to the atmosphere act as wicks absorbing moisture from the atmosphere. While extremely thin, synthetic polymer sheets are waterproof, they are not moisture-proof, but are porous enough to permit some moisture in the form of vapor to find its way through the sheets and to the fiber filaments. Thus, even when the filaments are completely covered by the sheets, there is likely to be some absorption of moisture. Frequently, however, especially with any cutting or trimming of the material as is customary in use, the ends of the fiber filaments are exposed and thus are vulnerable to moisture. When the fiber filaments do absorb moisture, they swell up thereby forcing the sheets to separate somewhat and, above all, they collect the moisture within the material where it can begin its disintegrating work.

In this form of the invention, therefore, the filaments are impregnated as well as being covered with a coating 12'. The polymer used for the impregnating and the coating is preferably cellulose acetate though the vinyl compounds of the first form could be employed. Cellulose acetate is preferred because it strengthens and stiffens the filaments of the fabric netting. If less stiffening effect and greater resilient pliability are desired, additional plasticizer, such as dibutyl phthalate, may be added. The sheets 13' are preferably cellulose acetate or cellulose acetate butyrate.

The method of production is generally similar to that described in connection with the first form of the material save that there is no necessity for running the woven netting through a cleansing bath and thus this step is eliminated from the process. Inasmuch as the fibrous filaments of the netting are impregnated as well as being coated, either more time will have to be allowed for the driving off of the solvent or water in the coating material or the temperature of the chamber 17 will have to be raised. The adjustment made to either or both should be such that the solvent is driven off to the desired degree as above expressed.

It is believed that I have perfected a glass substitute material as well as a method of making the same which is definitely superior and of an entirely different character from any reinforced glass substitute material heretofore conceived. The perfection of a highly transparent glass substitute material which has a high degree of ultraviolet ray transmission and of actinic ray transmission, while still having a durable product, is most difficult. Inasmuch as the ultraviolet and actinic rays of the sun are permitted to pass through the sheets as well as the coating, the well-known disintegrating effect of the actinic rays on synthetics can take place throughout the material unless the materials are carefully chosen to withstand the action of the actinic rays and unless the construction of the material is such that the harmful effect of the actinic rays is compensated for. Primarily, as above indicated, I attribute the greatly enhanced strength and durability of my product to the concept of the separate, distinct and permanent coating which is applied to the filaments of the netting and permitted to set before the outer laminations are applied. Also contributing very materially to the durability and strength of the material is the bonding of the sheets to one another throughout substantially the entire area of each mesh so as to keep the material completely free and devoid of any air spaces in which moisture can collect. This same feature contributes materially to the high degree of transparency of the product for it prevents any clouding of the material through condensation of moisture trapped within air spaces left in the product and it gives a uniform and homogeneous pane within each mesh. A material advantage in this respect is my discovery of a means for effecting the integrated and interflowed bond resulting in a homogeneous pane as distinguished from a construction in which any material is present which has any tendency to destroy the transparency.

I claim as my invention:

1. The method of making a reinforced, laminated material composed of a base and intermediate lamina of a woven, large mesh, fine filament, flexible netting and a lamina on each side of the netting composed of a preformed sheet of transparent, flexible plastic comprising the steps of passing the netting through a bath of a synthetic organic polymer reduced by the addition of a solvent to a fluidity such that the polymer coats the filaments of the netting only leaving the meshes thereof open, driving off the solvent to restore the polymer to its normal condition wherein it is resiliently yieldable, pliable and slightly stretchable with a somewhat tacky surface, applying to one surface of at least one of the sheets for a very brief period only a solvent capable of attacking and slightly softening the surface of the sheet as well as the coating applied to the netting, preheating the other of the sheets, applying the sheets to opposite sides of the netting with the solvent-treated surface of the one sheet facing inwardly, and applying heat and pressure to cause an interflowing of the softened surfaces of the sheets and coating and to drive off the solvent to cause a bonding of the interflowed areas.

2. The method of making a reinforced, laminated material composed of a base and intermediate lamina of a woven, large mesh, fine filament, flexible netting and a lamina on each side of the netting composed of a preformed sheet of transparent, flexible plastic comprising the steps of passing the netting through a bath of a synthetic organic polymer reduced by the addition of a solvent to a fluidity such that the polymer coats the filaments of the netting only leaving the meshes thereof open, driving off the solvent to restore the polymer to its normal condition wherein it is resiliently yieldable, pliable and slightly stretchable with a somewhat tacky surface, applying to one surface of at least one of the sheets for a very brief period only a solvent capable of attacking and slightly softening the surface of the sheet as well as the coating applied to the netting, preheating the other of the sheets, applying the sheets to opposite sides of the netting with the solvent treated surface of the one sheet facing inwardly, applying yieldable pressure to the opposite sides of the laminated material to conform around the filaments of the netting and pass into the meshes thereof to cause an interflowing of the softened surfaces of the sheets with the coating and with one another throughout substantially the entire area of each mesh, and simultaneously with the pressure applying heat to drive off the solvent and effect a permanent bonding of the interflowed surface areas.

3. The method of making a reinforced, laminated material composed of a base and intermediate lamina of a woven, large mesh, fine filament, flexible netting and a lamina on each side of the netting composed of a preformed sheet of transparent, flexible plastic comprising the steps of providing a synthetic organic polymer which in its normal state is resiliently yieldable, pliable and slightly stretchable, reducing the polymer by the addition of a solvent to a state of fluidity such that it is incapable of spanning a quarter-inch square opening, passing the netting through a bath of the liquified polymer so as to coat the filaments of the netting while leaving the meshes open, driving off the solvent so as to restore the coating on the filaments to substantially normal condition, applying to one surface of at least one of the sheets a solvent capable of attaching and slightly softening the surface of the sheet as well as the coating applied to the netting, the solvent being permitted to remain only for a period long enough to soften the surface of the sheet, preheating the other of the sheets, applying the sheets to opposite sides of the netting with the solvent treated surface of the one sheet facing inwardly, and applying heat and pressure in a manner permitting free escape of the solvent to cause an interflowing of the softened surfaces of the sheets and coating and to drive off the solvent to cause a bonding of the interflowed areas.

4. The method of making a reinforced, laminated material composed of a base and intermediate lamina of a woven, large mesh, fine filament, flexible netting and a lamina on each side of the netting composed of a preformed sheet of transparent, flexible plastic comprising the steps of passing the netting through a bath of a synthetic organic polymer reduced by the addition of a carrying medium to a fluidity such that the polymer coats the filaments of the netting only leaving the meshes thereof open, subjecting the coated netting to heat to restore the polymer to its normal condition wherein it is resiliently yieldable, pliable and slightly stretchable with a somewhat tacky surface, applying to one surface of at least one of the sheets for a very brief period only a solvent capable of attacking and slightly softening the surface of the sheet as well as the coating applied to the netting, preheating the other of the sheets, applying the sheets to opposite sides of the netting with the solvent-treated surface of the one sheet facing inwardly, and applying heat and pressure to cause an interflowing of the softened surfaces of the sheets and coating and to drive off the solvent to cause a bonding of the interflowed areas.

5. The method of making a reinforced, laminated material composed of a base and intermediate lamina of a woven, large mesh, fine filament, flexible netting and a lamina on each side of the netting composed of a preformed sheet of transparent, flexible plastic comprising the steps of passing the netting through a bath of a synthetic organic polymer in the form of a dispersion of a fluidity such that the polymer coats the filaments of the netting only leaving the meshes thereof open, subjecting the thus coated netting to heat to cause a changeover from a dispersion of the polymer to a solid wherein the polymer is resiliently yieldable, pliable and slightly stretchable with a somewhat tacky surface, applying to one surface of at least one of the sheets for a very brief period only a solvent capable of attacking and slightly softening the surface of the sheet as well as the coating applied to the netting, preheating the other of the sheets, applying the sheets to opposite sides of the netting with the solvent-treated surface of the one sheet facing inwardly, and applying heat and pressure to cause an interflowing of the softened surfaces of the sheets and coating and to drive off the solvent to cause a bonding of the interflowed areas.

References Cited in the file of this patent
UNITED STATES PATENTS

| Number | Name | Date |
|---|---|---|
| 1,322,631 | Segall | Nov. 25, 1919 |
| 1,327,281 | Jenkins | Jan. 6, 1920 |
| 1,950,662 | Dreyfus | Mar. 13, 1934 |
| 1,985,771 | Eichengrun | Dec. 25, 1934 |
| 2,028,670 | Hosking | Jan. 21, 1936 |
| 2,129,456 | Wynd | Sept. 6, 1938 |
| 2,231,529 | Dey | Feb. 11, 1941 |
| 2,329,456 | Campbell | Sept. 14, 1943 |